3,679,438
METHOD FOR MATURING WHEAT FLOUR
Fujihiko Yokoyama, Tokyo, Tohru Yoneyama, Saitamaken, and Shigehiko Sato, Higashivodogawa-ku, Osaka, Japan; said Yokoyama and said Yoneyama assignors to Nisshin Flour Milling, Ltd., Tokyo, and said Sato assignor to Takeda Chemical Industries, Ltd., Osaka, Japan
No Drawing. Filed May 14, 1969, Ser. No. 824,663
Int. Cl. A21d 2/04, 2/20
U.S. Cl. 99—232                                   10 Claims

ABSTRACT OF THE DISCLOSURE

Freshly milled wheat flour can be matured in a remarkably shortened period of time without fear of over-maturing by incorporating thereinto at least one of hydrogen peroxide adducts of alkali metal phosphates and alkali metal carbonates in a concentration of from about 10 to about 500 parts per million parts by weight of the flour, the alkali metal being sodium or potassium.

---

The present invention is concerned with a method for maturing wheat flour. More particularly, the present invention relates to a method for maturing wheat flour by incorporating into freshly milled wheat flour specified hydrogen peroxide adducts.

As doughs made from freshly milled wheat flour are undesirably sticky, are difficult to be handled and do not bake well, it is an established practice to let the fresh wheat flour mature before using to ameliorate such undesirable qualities.

Maturing of wheat flour may be carried out by keeping freshly milled wheat flour standing for a few weeks. However, such natural maturing of wheat flour is disadvantageous from industrial viewpoints, for it not only involves some form of packaging for the maturing but also requires a large space to store the flour for the maturing in the mills. Therefore, a variety of maturing agents are employed, such as ammonium persulfate, chlorine dioxide, potassium bromate and the like, in order to mature freshly milled wheat flour in a shortened period of time.

The present inventors have carried out extensive studies for finding new maturing agents for wheat flour and accelerated maturing methods for wheat flour and have unexpectedly found that a hydrogen peroxide adduct of alkali metal phosphates or of alkali metal carbonates, the alkali metal being sodium or potassium, exhibits remarkably superior activities compared with the hitherto known flour-maturing agents.

Thus, the principal object of the present invention is to provide a method for maturing wheat flour in a shortened period of time, which is carried out by a simple way without fear of over-maturing and yields wheat flour having excellent properties similar to naturally matured wheat flour. Another object of the present invention is to provide a new industrially profitable maturing agent for wheat flour.

The hydrogen peroxide adducts to be employed in the method of the present invention include those of alkali metal phosphates and those of alkali metal carbonates, which are exemplified by disodium or dipotassium orthophosphate-hydrogen peroxide adducts as shown by $M_2HPO_4 \cdot H_2O_2$ (hereinafter M represents sodium or potassium), trisodium or tripotassium pyrophosphate-hydrogen peroxide adducts as shown by $M_3HP_2O_7 \cdot 2H_2O_2$, tetrasodium or tetrapotassium pyrophosphate-hydrogen peroxide adducts as shown by $M_4P_2O_7 \cdot 2H_2O_2$, sodium or potassium triphosphate-hydrogen peroxide adducts as shown by $M_5P_3O_{10} \cdot XH_2O_2$ (wherein X stands for ½ to 2), sodium or potassium carbonate-hydrogen peroxide adducts as shown by $M_2CO_3 \cdot XH_2O_2$ (wherein X is as defined above), or a mixture of more than one of them. (Hereinafter the hydrogen peroxide adduct or adducts mentioned above are referred to as "the hydrogen peroxide adduct.")

Typical examples of the hydrogen peroxide adduct are $Na_2HPO_4 \cdot H_2O_2$, $K_2HPO_4 \cdot H_2O_2$, $Na_3HP_2O_7 \cdot 2H_2O_2$ $K_3HP_2O_7 \cdot 2H_2O_2$, $Na_4P_2O_7 \cdot 2H_2O_2$, $K_4P_2O_7 \cdot 2H_2O_2$ $Na_5P_3O_{10} \cdot \frac{1}{2}H_2O_2$, $K_5P_3O_{10} \cdot H_2O_2$, $Na_5P_3O_{10} \cdot 2H_2O_2$ $Na_2CO_3 \cdot H_2O_2$, $K_2CO_3 \cdot 2H_2O_2$ and the like.

The hydrogen peroxide adducts are known compounds and can be obtained easily by per se known methods, for example, by reacting the corresponding alkali metal phosphate or carbonate in solution with theoretical amount of hydrogen peroxide and then subjecting the reaction mixture to concentration under reduced pressure or spray drying to give crystals or powder of the desired hydrogen peroxide adduct.

The hydrogen peroxide adduct offers, in the flour-maturing process, the following advantages compared with the hitherto known maturing agents:

(1) Maturing of wheat flour takes place immediately and thoroughly after incorporation of the hydrogen peroxide adduct to fresh flour and when the substrate flour is allowed to stand under the natural conditions, the hydrogen peroxide adduct decomposes relatively rapidly out of existence and leaves no harmful ingredient behind. Even when doughs are made from the wheat flour containing the hydrogen peroxide adduct, the hydrogen peroxide adduct decomposes rapidly mainly by action of catalase in the doughs. Therefore, the method of the present invention is hygienically safe.

(2) Compared with the hitherto known maturing agents, the hydrogen peroxide adduct provides a more satisfactory maturing result which is comparable to that of natural maturing. Moreover, the tolerance limits for the amount of the hydrogen peroxide adducts to be incorporated into fresh flour are more liberal and there occurs no over-maturing, because the hydrogen peroxide adducts rapidly decompose themselves in the substrate flour after the completion of maturing.

(3) The water-soluble fraction of the doughs made from the wheat flour which has been matured with the hydrogen-peroxide adduct has a characteristically increased viscosity with the result that these doughs show a reduced adhesiveness similar to those from naturally matured wheat flour. Such adhesiveness-reducing effect cannot be attained by the conventional maturing agents.

In the method of the present invention, one or more of the hydrogen peroxide adducts are incorporated into freshly milled wheat flour. The incorporation may be carried out by merely adding the same homogeneously in the wheat flour after the milling step or at the time of milling. The hydrogen peroxide adduct may be added without dilution or after diluted with a proper dilutor such as calcium carbonate, starch or wheat flour to a suitable concentration.

The amount of the hydrogen peroxide adduct to be added to freshly milled flours varies with races of raw wheats, the desired period of time to complete maturing. An amount which will provide more than 10, most advantageously from about 20 to about 200 parts of the hydrogen peroxide adduct by weight per million parts by weight of freshly milled wheat flours gives practically desirable results. The upper limit is defined primarily by economic consideration. That is, generally a concentration in excess of about 500 parts by weight per million offers no particular advantages in maturing effects.

The wheat flours thus incorporated with the hydrogen peroxide of the present invention mature rapidly on storage at a room temperature for a shortened period of time. The period of time required to complete maturing varies with the amounts of the hydrogen peroxide adduct added, races of the wheats, the conditions where the wheat flours are stored, and the like. In general, 1 to 5 days are sufficient for the completion of maturing of freshly milled wheat flour, which means that it is possible according to the present invention to shorten the period of time required for maturing to about between one-third and one-tenth of that in natural maturing.

Thus matured wheat flour has the excellent properties, especially in the doughs made therefrom, the doughs having a remarkably reduced adhesiveness compared with doughs made from wheat flours matured by a conventional maturing agent. Therefore, the wheat flour matured according to the present invention is excellent for various kinds of wheat flour products, especially bakery products such as breads, biscuits, cakes, muffins, doughnuts and the like. Most especially, the wheat flour matured by the method of the present invention is excellent as bread flour because good machinability of doughs and good loaves result.

TEST 1

Flour A: Wheat flour which was obtained by homogeneously adding disodium orthophosphate-hydrogen peroxide adduct ($Na_2HPO_4 \cdot H_2O_2$) into freshly milled wheat flour so as to make its concentration 50 parts by weight per million parts by weight of the flour, and keeping the mixture standing at 30° C. for 1 day.

Control Flour A: Wheat flour which was obtained by keeping freshly milled wheat flour standing at 30° C. for 1 day without addition of disodium orthophosphate-hydrogen peroxide adduct.

Rheological properties of respective doughs made from Flour A and Control Flour A were measured employing Texturometer (see "Journal of Food Science" 28, pp. 390–396 (1963)). To Flour A and Control Flour A was added sufficient water to give 500 Brabender Unit and then mixed for 3 minutes, respectively. Each 150 grams of the respective doughs was put into the cylinder (8 cm. x 3 cm.) of Texturometer and rheological properties were measured after rested at 30° C. for 60 minutes.

The results are summarized in Table 1.

TABLE 1

|  | Control flour A | Flour A |
|---|---|---|
| Hardness | 1.7 | 2.0 |
| Cohesiveness | 0.93 | 0.88 |
| Elasticity | 9.1 | 8.1 |
| Adhesiveness | 4.3 | 2.7 |
| Gumness | 1.7 | 1.8 |
| Chewyness | 15.5 | 14.6 |

TEST 2

Freshly milled flour was kept standing at 20° C. for 1 day after the addition of tetrasodium pyrophosphate-hydrogen peroxide adduct ($Na_4P_2O_7 \cdot 2H_2O_2$), disodium orthophosphate-hydrogen peroxide adduct $$(Na_2HPO_4 \cdot H_2O_2)$$

or disodium carbonate-peroxide adduct ($Na_2CO_3 \cdot 2H_2O_2$) in a concentration of 50 parts by weight per million parts by weight of the flour.

Doughs were made from the respective resulting flours and the rheological properties of those doughs were measured employing Texturometer after the manner described in Test 1.

The results are summarized in Table 2.

TABLE 2

|  | Flour | | | |
|---|---|---|---|---|
|  | B | C | D | Control |
| Additive | (1) | (2) | (3) | --- |
| Hardness | 5.2 | 5.1 | 5.2 | 5.0 |
| Cohesiveness | 0.78 | 0.80 | 0.82 | 0.86 |
| Adhesiveness | 3.4 | 3.6 | 3.3 | 4.4 |
| Elasticity | 9.0 | 8.7 | 8.8 | 9.0 |

1 $Na_4P_2O_7 \cdot 2H_2O_2$.
2 $Na_2HPO_4 \cdot H_2O_2$.
3 $Na_2CO_3 \cdot 2H_2O_2$.

TEST 3

Freshly milled flour was stored at 0° C. or 30° C. for 1, 3 or 7 days after the addition of tetrasodium phosphate-hydrogen peroxide adduct ($Na_4P_2O_7 \cdot 2H_2O_2$), disodium orthophosphate-hydrogen peroxide adduct $$(Na_2HPO_4 \cdot H_2O_2)$$

or disodium carbonate peroxide adduct ($Na_2CO_3 \cdot 2H_2O_2$) in a concentration of 50 parts by weight per million parts by weight of the flour.

Doughs were made employing the respective resulting flours by the straight and dough method in the following composition:

|  | Grams |
|---|---|
| Wheat flour | 300 |
| Yeast | 6 |
| Sugar | 9 |
| Shortening | 6 |
| Table salt | 4.5 |

Each dough was fermented at 28.5° C. and 75% relative humidity for 90 minutes as the primary fermentation and then fermented at the same conditions as above for 30 minutes as the secondary fermentation. The respective doughs were subjected to make-up i.e. dividing, rounding, moulding and intermediate proofing at 39° C. and 88% relative humidity for 40 minutes and then baked at 210° C. for 35 minutes.

Volume of loaves from the respective doughs was measured by Seed Replacement Method.

The results are summarized in Table 3:

TABLE 3
[Volume of loaves in cubic centimeter]

| Storage temperature (° C.) | Period of storage (day) | Additive | | | |
|---|---|---|---|---|---|
|  |  | $Na_4P_2O_7 \cdot 2H_2O_2$ | $Na_2HPO_4 \cdot H_2O_2$ | $Na_2CO_3 \cdot 2H_2O_2$ | Control |
| 0 | 1 | 1,700 | 1,690 | 1,720 | 1,630 |
| 0 | 3 | 1,720 | 1,720 | 1,760 | 1,660 |
| 0 | 7 | 1,760 | 1,740 | 1,780 | 1,670 |
| 30 | 1 | 1,750 | 1,720 | 1,760 | 1,670 |
| 30 | 3 | 1,780 | 1,750 | 1,780 | 1,700 |
| 30 | 7 | 1,790 | 1,790 | 1,800 | 1,750 |

Having thus disclosed the invention, what is claimed is:

1. A method for maturing wheat flour which comprises incorporating into freshly milled wheat flour at least one of the hydrogen peroxide adducts of alkali metal phosphates and of alkali metal carbonates in an amount such that the hydrogen peroxide adduct is present in the flour in a concentration of from 10 to about 500 parts per million parts by weight of the flour, wherein the alkali metal is sodium or potassium, and maintaining the flour-adduct mixture at a temperature and a period of time sufficient to mature the wheat flour.

2. A method according to claim 1, wherein the concentration of the hydrogen peroxide adduct is from about 20 to about 200 parts per million parts by weight of the flour.

3. A method according to claim 1, wherein the hydrogen peroxide adduct is hydrogen peroxide adduct of dialkali metal orthophosphate.

4. A method according to claim 1, wherein the hydrogen peroxide adduct is hydrogen peroxide adduct of trialkali metal pyrophosphate.

5. A method according to claim 1, wherein the hydrogen peroxide adduct is hydrogen peroxide adduct of tetraalkali metal pyrophosphate.

6. A method according to claim 1, wherein the hydrogen peroxide adduct is hydrogen peroxide adduct of alkali metal triphosphate.

7. A method according to claim 1, wherein the hydrogen peroxide adduct is hydrogen peroxide adduct of alkali metal carbonate.

8. A method according to claim 1, wherein the hydrogen peroxide adduct is disodium orthophosphate-hydrogen peroxide adduct.

9. A method according to claim 1, wherein the hydrogen peroxide adduct is tetrasodium pyrophosphate-hydrogen peroxide adduct.

10. A method according to claim 1, wherein the hydrogen peroxide adduct is disodium carbonate-hydrogen peroxide adduct.

References Cited

UNITED STATES PATENTS

| 2,272,576 | 2/1942 | Penn | 99—232 |
| 2,777,749 | 1/1957 | Young | 99—91 |

FOREIGN PATENTS

| 496,066 | 9/1953 | Canada | 99—91 |

RAYMOND N. JONES, Primary Examiner

U.S. Cl. X.R.

99—93